United States Patent
Jafarkhani et al.

(10) Patent No.: US 6,542,619 B1
(45) Date of Patent: Apr. 1, 2003

(54) METHOD FOR ANALYZING VIDEO

(75) Inventors: Hamid Jafarkhani, Middletown, NJ (US); Behzad Shahraray, Freehold, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/549,058

(22) Filed: Apr. 13, 2000

Related U.S. Application Data

(60) Provisional application No. 60/129,090, filed on Apr. 13, 1999.

(51) Int. Cl.$^7$ .................................................. G06K 9/00
(52) U.S. Cl. ...................... 382/100; 382/174; 382/240; 382/278; 348/700
(58) Field of Search ............................... 382/100, 174, 382/240, 278, 190; 348/700

(56) References Cited

U.S. PATENT DOCUMENTS

| | | | |
|---|---|---|---|
| 5,734,735 A | * 3/1998 | Coleman, Jr. | 382/100 |
| 5,821,945 A | * 10/1998 | Yeo et al. | 345/440 |
| 6,031,927 A | * 2/2000 | Rao et al. | 382/100 |
| 6,157,744 A | * 12/2000 | Nagasaka et al. | 382/236 |

OTHER PUBLICATIONS

Zhuang et al. "Efficient Multiresolution Scene Change Detection by Wavelet Transformation." Int. Conf. on Consumer Electronics, Jun. 1997, pp. 250–251.*
G. Lupatini, "Scene Break Detection: A Comparison", *Research Issues in Data Engineering*, 1998, pp. 34–41.
Behzad, Shahrary. "Scene change detention and content–based sampling of video sequences." "*Digital Video Compression . . .* " 1995 pp. 1–12.

* cited by examiner

*Primary Examiner*—Jon Chang
(74) *Attorney, Agent, or Firm*—Wendy W. Koba

(57) ABSTRACT

A method and system for recognizing scene changes in digitized video is based on using one-dimensional projections from the recorded video. Wavelet transformation is applied on each projection to determine the high frequency components. These components are then auto-correlated and a time-based curve of the autocorrelation coefficients is generated. A decision is made to define a "scene change" when the autocorrelation coefficient curves are greater than a predetermined value.

5 Claims, 1 Drawing Sheet

METHOD FOR ANALYZING VIDEO

CROSS-REFERENCE TO RELATED APPLICATION

This application claims priority to Application No. 60/129,090, filed Apr. 13, 1999.

TECHNICAL FIELD

The present invention relates to a method for analyzing video frames and, more particularly, to a time-based evolution method of detecting scene changes in a video.

BACKGROUND OF THE INVENTION

The automatic analysis of video based on its content has applications in indexing and retrieval of visual information. In particular, the ability to automatically recognize a "scene change" in a video can be used to provide a useful index based on scene identity. Previous methods of automatically recognizing a "scene change" are based on defining a feature, or a "dissimilarity measure", between two frames. When the dissimilarity measure is "high", the two frames are defined as belonging to different scenes. A quantitative method of defining a "high" dissimilarity measure (usually through defining threshold values) is then the basis for defining a scene change. Various prior art algorithms have used histograms, motion and contour information for the features that are studied. A detailed analysis of various prior art approaches to determining scene changes can be found in the article entitled "Scene Break Detection: A Comparison", by G. Lupatini et al. appearing in the *Proceedings of the Workshop on Research Issues in Data Engineering*", 1998, at pp. 34–41.

Many prior art approaches use techniques such as motion estimation and contour detection and attempt to determine "instant" values to define scene changes. The applied algorithms are based on a two-dimensional analysis of the video, are relatively complex and time-consuming to apply on an on-going basis.

Thus, a need remains in the art for a relatively simple, yet accurate method of detecting scene changes in recorded video.

SUMMARY OF THE INVENTION

The need remaining in the prior art is addressed by the present invention, which relates to a method for analyzing video frames and, more particularly, to a time-based evolution method of detecting scene changes in a video.

In accordance with the present invention, a video scene change is defined by creating one-dimensional projections of the video frames. At each spatial location, the time evolution of the one-dimensional projection is considered as a signal and the wavelet transform is calculated. At each time, therefore, the wavelet transforms are one-dimensional signals that can be used to define the high frequency components of the original video. The autocorrelation functions of the high frequency components are then calculated and used as features for scene change detection.

In one embodiment, the time evolution of the one-dimensional features can be displayed as curves. Scene change detection is accomplished by analyzing the shape of the curve.

Other and further features of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
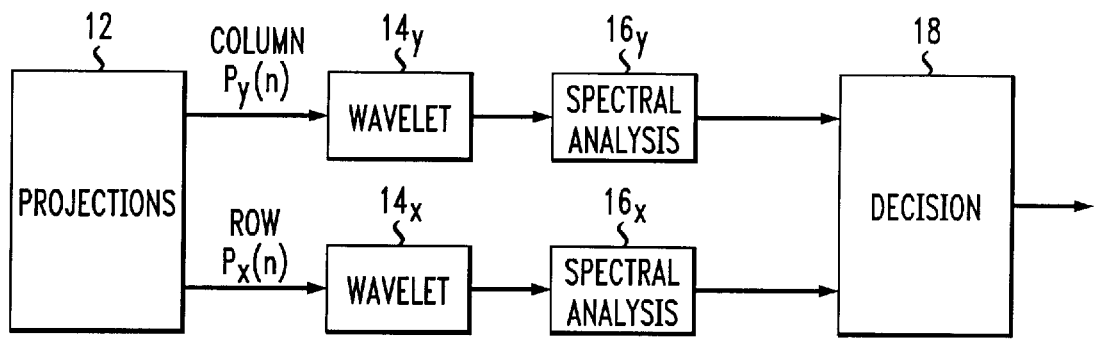
FIG. 1 contains a block diagram of the scene change detection system of the present invention.

FIG. 1 illustrates an exemplary system 10 of the present invention for detecting video scene changes. As mentioned above, prior art systems utilizes two-dimensional video analysis (contour changes, for example) that may be complicated and time-consuming to analyze. In contrast, the arrangement of the present invention uses only one-dimensional signals, evaluating these as a function of time to define scene changes. Referring to FIG. 1, system 10 includes a projection device 12 which is responsive to the incoming video. Projection device 12 derives one-dimensional signals from the video, in this case defined as a "column" (vertical) projection and "row" (horizontal) projection.

For the purposes of the present invention, it is presumed that the two-dimensional visual characteristic of the nth video frame (for example, intensity or color) is represented by $A_n(x,y)$, where x is the row index and y is the column index (the video is presumed to be digitized). To reduce the complexity of the video, projection device 12 creates row projection $P_x(n)$ and column projection $P_y(n)$ using the following formulas:

$$P_x(n) = \Sigma_y A_n(x,y)$$

$$P_y(n) = \Sigma_x A_n(x,y),$$

where $P_x(n)$ and $P_y(n)$ are considered as one-dimensional temporal signals.

The row and column one-dimensional projection outputs from projection device 12 are then applied as inputs to a pair of wavelet transformers $14_y$ and $14_x$, column projection $P_y(n)$ applied as input to wavelet transformer $14_y$ and row projection $P_x(n)$ applied as an input to wavelet transformer $14_x$. In general, at each spatial location, the time evolution of a projection (either row or column) is considered and the wavelet transform calculated. In particular, the premise behind a wavelet transform is to decompose the input signal (in this case, the projection) into two components: (i) a low-resolution approximation; and (ii) a detail signal. That is, the projection is decomposed into low-pass and high-pass components, generally referred to as subbands.

Figure 2:
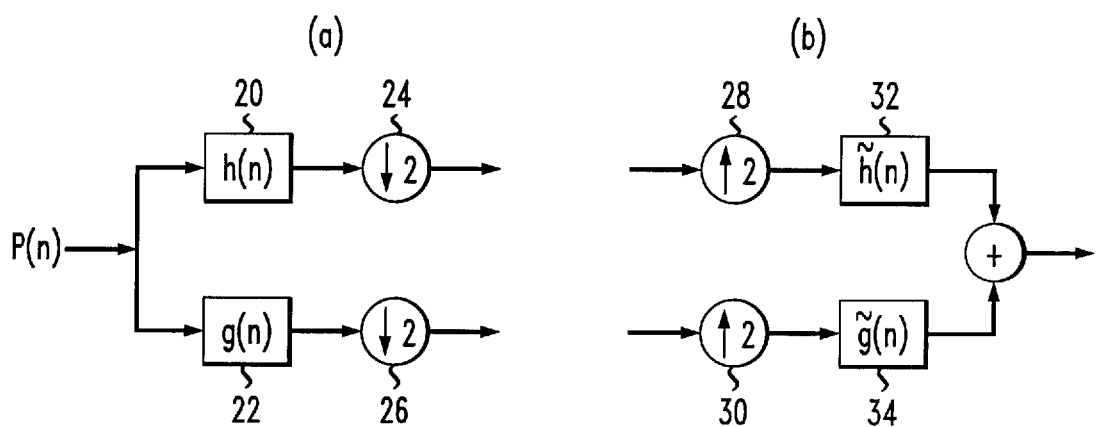
FIG. 2 illustrates an exemplary implementation of a wavelet transform function.

FIG. 2 illustrates in detail an exemplary wavelet transformer 14, transformer 14 performing both decomposition and reconstruction of the applied input signal. The input to transformer 14 (such as the column projection $P_y(n)$) is first applied, in parallel to a pair of finite impulse response (FIR) filters 20,22, where filter 20 is defined by the function h(n) and filter 22 is defined by the function g(n). Filters 20,22 are followed, respectively, by down-samplers 24 and 26. At this point, the one-dimensional input projection has been decomposed into the two components. Reconstruction is accomplished by first up-sampling the components, using a pair of samplers 28, 30, then using complementary finite impulse response filters 32,34, where filter 32 is defined by the function h and filter 34 is defined by the function g. In one embodiment of wavelet transformer 14, a "delayed" wavelet transform function may be used. In this case, instead of using P(n), P(n+1), P(n+2), . . . to calculate the $n^{th}$ wavelet coefficient, the series P(n), P(n+d), P(n+2d), . . . , where d is the delay.

In any embodiment of the present invention, the output of interest from wavelet transformers 14 is the high frequency component of the projection. Referring back to FIG. 1, the output from each wavelet transformer 14 is subsequently applied as an input to an associated spectral analyzer 16, which performs an autocorrelation function of the high frequency component to define the "feature" that is ultimately evaluated to define a "scene change". In particular, the $m^{th}$ autocorrelation coefficient of a stationary real random process $X(n)$ is defined as $r(m)=E[X(n-m)X(n)]$, $m=0, 1, 2, \ldots$. If the conditions of the ergodic theorem hold, the autocorrelation coefficients can be calculated using "ensemble averages" instead of the expectations as defined above. In this case, therefore, the autocorrelation function can be defined as follows:

$$r(m)=\Sigma_n x(n-m)x(n), m=0,1,2,\ldots$$

The autocorrelation function outputs from spectral analyzers $16_y$ and $16_x$ are then applied to a decision module 18 which utilizes these definitions of "features" to determine if a scene change has occurred. In particular, the time evolution of the autocorrelation functions are analyzed and the average intensity is evaluated. For example, the first autocorrelation coefficients of a delayed wavelet transform (i.e., the high frequency subbands) of the projections are reviewed. When a scene change occurs, the general shape of the curve resembles a pulse with a width d. To capture such a pulse, the autocorrelation coefficients are valued at times n−2, n−1, n, n+1, n+2, . . . , n+d, n+d+1. In general terms, the values at times n, n+1, n+2, . . . , n+d−1 must be relatively "high" and the values at times n−2, n−1, n+d, n+d+1 must be relatively "low". Such a behavior may be captured by comparing these d+4 values with each other and with "adaptive thresholds" that are calculated based on the history of the curves.

A subset of "scene changes" in general is defined as a "fade". A fade may be detected based on two phenomena in the behavior of the collected data. First, a strong maximum in the autocorrelation coefficient curves (the general definition of a "scene change" coupled with a flat minimum in the average intensity curve. In general, however, any strong maximum in the autocorrelation coefficient curves can be used in accordance with the present invention to define a scene change.

What is claimed is:

1. A method of determining a scene change in a digitized video recording, the method comprising the steps of:

a) creating a first one-dimensional projection from the frames in the digitized video recording;

b) creating a second one-dimensional projection, orthogonal to the first, from said frames;

c) for each one-dimensional projection, performing a wavelet transformation to determine high frequency components;

d) auto-correlating the high frequency components generated in step c);

e) preparing time-based representations of the autocorrelation coefficients formed in step d), in the form of autocorrelation coefficient curves; and f) defining a scene change when said autocorrelation coefficient curves exhibit a predetermined maximum value.

2. The method as defined in claim 1 wherein in performing steps a) and b), row and column one-dimensional projections are created.

3. The method as defined in claim 2 wherein the row and column one-dimensional projections are defined as follows:

$$P_x(n)=\Sigma_y A_n(x,y)$$

$$P_y(n)=\Sigma_x A_n(x,y).$$

4. The method as defined in claim 1 wherein in performing step c), the following steps are performed:

1) decomposing the one-dimensional projection using a pair of finite impulse response filters; and 2) down-sampling the output from each finite impulse response filter.

5. A system for determining a scene change in a digitized video recording, the system comprising a projection device responsive to the digitized video recording for providing as an output a pair of one-dimensional projections of the digitized video;

first and second wavelet transformers, each coupled to receive a separate one of the pair of one-dimensional video projections created by the projection device, the wavelet transformers for decomposing the one-dimensional input and providing a time-based output including high frequency components;

first and second spectral analyzers coupled to the outputs of the first and second wavelet transformers, respectively, for autocorrelating the outputs to determine the features related to scene changes; and a decision module coupled to the output of the first and second spectral analyzers for reviewing time-based representations of the autocorrelation features and defining a scene change when the time-based representations reach a predetermined value.

* * * * *